US010945259B2

(12) United States Patent
Tang

(10) Patent No.: US 10,945,259 B2
(45) Date of Patent: Mar. 9, 2021

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/829,977

(22) Filed: Mar. 25, 2020

(65) Prior Publication Data

US 2020/0229162 A1 Jul. 16, 2020

Related U.S. Application Data

(63) Continuation of application No. PCT/CN2017/104435, filed on Sep. 29, 2017.

(51) Int. Cl.
*H04W 72/04* (2009.01)
*H04L 1/00* (2006.01)
*H04W 48/16* (2009.01)

(52) U.S. Cl.
CPC ......... *H04W 72/042* (2013.01); *H04L 1/0038* (2013.01); *H04W 48/16* (2013.01); *H04W 72/0446* (2013.01)

(58) Field of Classification Search
CPC ............... H04W 72/04; H04W 72/042; H04W 72/0446; H04W 72/0413; H04W 72/0453; H04W 72/12; H04W 16/14; H04W 24/10; H04W 48/16; H04W 72/0406; H04W 72/02; H04W 48/12; H04W 4/40; H04W 56/001
USPC .......................................... 375/260; 370/330
See application file for complete search history.

(56) References Cited

U.S. PATENT DOCUMENTS

2007/0177494 A1\* 8/2007 Tomizawa ............... H04L 5/023
370/208
2018/0132244 A1\* 5/2018 Huang .............. H04W 72/0453

FOREIGN PATENT DOCUMENTS

CN 101494904 A 7/2009

OTHER PUBLICATIONS

AT&T, On the Contents of Group Common PDCCH, 3GPP TSG RAN WG1 NR Ad-Hoc#2, R1-1710439, Jun. 30, 2017, 3 pgs.
(Continued)

*Primary Examiner* — David C Payne
*Assistant Examiner* — Sarah Hassan
(74) *Attorney, Agent, or Firm* — Morgan, Lewis & Bockius LLP

(57) ABSTRACT

Embodiments of this application provide a data transmission method, a terminal device and a network device, to reduce complexity of blindly detecting a PDCCH by the terminal device. The method includes: receiving by a terminal device, an SFI sent by a network device; determining, by the terminal device according to the SFI, at least one of a slot format in one time unit and a time length suitable for the slot format; and detecting, by the terminal device, a PDCCH according to the slot format corresponding to the one of the one or more slot format indices indicated by the SFI.

16 Claims, 4 Drawing Sheets

(56) References Cited

OTHER PUBLICATIONS

Guangdong OPPO Mobile Telecommunmications Corp. Ltd., International Search Report and Written Opinion, PCT/CN2017/104435, dated Jun. 21, 2018, 18 pgs.
Huawei & HiSilicon, Contents of group-common PDCCH, 3GPP TSG RAN WG1 NR Ad Hoc Meeting, R1-1709953, Jun. 30, 2017, 4 pgs.
Sony, On structure of group-common PDCCH, 3GPP TSG RAN WG1 NR Ad-Hoc#2, R1-1710857, Jun. 30, 2017, 3 pgs.
InterDigital Inc., On group-common PDCCH contents, 3GPP TSG RAN WG1 Meeting #90, R1-1714150, Aug. 25, 2017, 3 pgs.
Vivo, Group-common PDCCH contents, 3GPP TSG RAN WG1 Meeting#90, R1-1712850, Aug. 25, 2017.
Wilus Inc., Discussion on UE behavior for group-common PDCCH for NR, 3GPP TSG RAN WG1 Meeting NR#3, R1-1716631, Sep. 21, 2017, 7 pgs.
R1-1708113, Panasonic, Discussion on group common PDCCH, 3GPP TSG RAN WG1 Meeting #89, Hangzhou, P.R. China, May 15-19, 2017, 5 pgs.
R1-1707165, ZTE Common PDCCH design for NR, 3GPP TSG RAN WG1 #89, Hangzhou, China, May 15-19, 2017, 4 pgs.
R1-1707634, LG Electronics, Discussion on the contents and the signaling of group common PDCCH, 3GPP TSG RAN WG1 Meeting #89, Hangzhou, China, May 15-19, 2017, 5 pgs.
R1-1707385, Intel Corporation, Group-common PDCCH: Contents, 3GPP TSG RAN WG1 #89, Hangzhou, P.R. China, May 15-19, 2017, 4 pgs.
R1-1708614, Qualcomm Incorporated, Contents of group common PDCCH, 3GPP TSG-RAN WG1 #89, Hangzhou, P.R. China, May 15-19, 2017, 6 pgs.
R1-1708146, Huawei, HiSilicon, Contents of group-common PDCCH, 3GPP TSG RAN WG1 Meeting #89, Hangzhou, China, May 15-19, 2017, 4 pgs.
R1-1715781, Panasonic Remaining details on group-common PDCCH, 3GPP TSG RAN WG1 Meeting NR#3, Nagoya, Japan, Sep. 18-21, 2017, 4 pgs.
R1-1715631, Vivo, Design of group-common PDCCH, 3GPP TSG RAN WG1 NR Adhoc#3. Nagoya, Japan, Sep. 18-21, 2017, 9 pgs.
R1-1715981, Samsung, on Ue-Group Common Pdcch, 3GPP TSG RAN WG1 Meeting NR#3, Nagoya, Japan, Sep. 18-25, 2017, 4 pgs.
R1-1716308, Intel Corporation, on group-common PDCCH, 3GPP TSG RAN WG1 Meeting NR#3, Nagoya, Japan, Sep. 18-21, 2017, 10 pgs.
R1-1715520, ZTE, Sanechips, Remaining details on group-common PDCCH, 3GPP TSG RAN WG1 Meeting NR#3, Nagoya, Japan, Sep. 18-21, 2017, 5 pgs.
R1-1716631, Wilus Inc, Discussion on UE Behavior for group common PDCCH for NR, 3GPP TSG RAN WG1 Meeting NR#3, Nagoya, Japan, Sep. 18-21, 2017, 7 pgs.
R1-1715642, Vivo on DL/UL resource allocation, 3GPP TSG RAN WG1 Meeting NR#3, Nagoya, Japan, Sep. 18-21, 2017, 8 pgs.
R1-1716096, NTT Docomo, Inc., Remaining issues on group common PDCCH, 3GPP TSG RAN WG1 Meeting NR#3, Nagoya, Japan, Sep. 18-21, 2017, 10 pgs,.
Oppo Guangdong Oppo Mobile Telecommunications Corp. Ltd., Extended European Search Report, EP17926632.5 dated Jul. 21, 2020, 7 pgs.

* cited by examiner

500
A network device generates a slot format indicator SFI, where the SFI is used to indicate at least one of a slot structure in one time unit and a time length suitable for the slot structure — S510
The network device sends the SFI to a terminal device — S520
FIG. 5
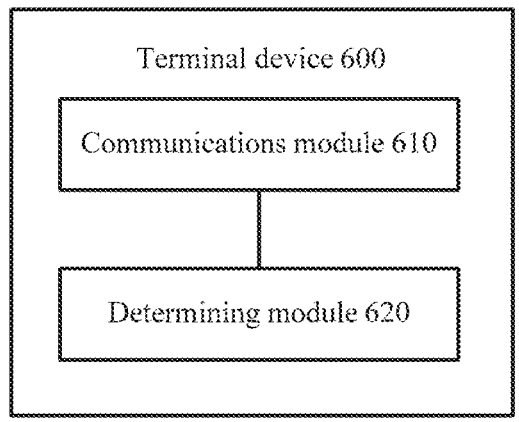
FIG. 6
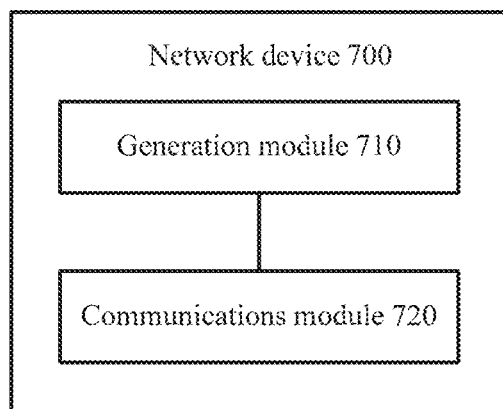
FIG. 7

DATA TRANSMISSION METHOD, TERMINAL DEVICE, AND NETWORK DEVICE

CROSS-REFERENCE TO RELATED APPLICATION

This application is a continuation application of PCT Patent Application No. PCT/CN2017/104435, entitled "DATA TRANSMISSION METHOD, TERMINAL DEVICE, AND NETWORK DEVICE" filed on Sep. 29, 2017, which is incorporated by reference in its entirety.

TECHNICAL FIELD

This application relates to the communications field, and more specifically, to a data transmission method, a terminal device, and a network device.

RELATED ART

In a new radio (NR) system, a slot (slot) or a symbol is used as a scheduling unit, and each slot includes X symbols, for example, X=14. In one slot, there may be a downlink (DL) symbol, an uplink (UL) symbol, a reserved (reserved) symbol and an unknown (unknown) symbol. The reserved symbol is not used for uplink or downlink transmission, and the unknown symbol can be changed into the uplink or the downlink symbol through dynamic signaling and used for uplink or downlink transmission. A specific slot format can be indicated by using a slot format indicator (SFI). For example, a base station can send the SFI in a group common physical downlink control channel (group common PDCCH), and notify a terminal device of the used slot format.

The NR system can support a multi-slot (multi-slot) and a single slot SFI identification manner. The single slot SFI identifier can indicate a slot format of one slot, and the multi-slot SFI identifier may be used to indicate a slot format of a plurality of slots. Therefore, for the multi-slot and the single slot SFI identification manner, different quantities of bits are required, and complexity of blindly detecting the PDCCH by the terminal device is increased in a certain degree.

Therefore, how to perform SFI indication to reduce complexity of the blind detection by the terminal device is a problem needed to be urgently resolved.

SUMMARY

Embodiments of this application provide a data transmission method, a terminal device and a network device, to reduce complexity of blindly detecting a PDCCH by the terminal device.

According to a first aspect a data transmission method is provided. The method includes:

receiving, by a terminal device, an SFI sent by a network device;

determining, by the terminal device according to the SFI, at least one of a slot format in one time unit and a time length suitable for the slot format; and detecting, by the terminal device, a PDCCH according to the slot format corresponding to the one of the one or more slot format indices indicated by the SFI.

Therefore, the SFI in this embodiment of this application is different from an existing SFI. The SFI can be used to not only indicate a slot format in one time unit, but also indicate a time length suitable for the slot format. In this way, the slot format can be used in several time units following a time unit (which can be a current time unit, or can be a time unit after the current time unit), and it is not necessary to send the SFI in the next several time units, so that signaling overheads can be reduced, and complexity of blindly detecting a PDCCH by the terminal device can also be reduced.

Optionally, in the embodiments of this application, the time unit may be one or more slots, or may be one or more transmission time intervals (TTI).

With reference to the first aspect, in some implementations of the first aspect, the time unit is one slot.

With reference to the first aspect, in some implementations of the first aspect, the SFI is used to indicate number information of downlink symbols and/or number information of uplink symbols included in one slot, and the determining, by the terminal device according to the SFI, at least one of a slot format in one time unit and a time length suitable for the slot format includes:

determining, by the terminal device, M symbols starting from the first symbol in one slot as a time domain location used for downlink transmission, where M is the number of downlink symbols, and M is an integer greater than or equal to 0; and/or determining, by the terminal device, last N symbols in one slot as a time domain location used for uplink transmission, where N is the number of uplink symbols, and N is an integer greater than or equal to 0.

Therefore, according to the identification method for the SFI in the embodiments of this application, it is not necessary to indicate a state of each symbol in one slot. Compared with a manner in which the state of each symbol in one slot is indicated, signaling overheads can be reduced.

With reference to the first aspect, in some implementations of the first aspect, the detecting, by the terminal device, a PDCCH according to the slot format corresponding to the one of the one or more slot format indices indicated by the SFI includes:

detecting, by the terminal device, the PDCCH in the M symbols starting from the first symbol.

With reference to the first aspect, in some implementations of the first aspect, the SFI is used to indicate a slot format index, and the determining, by the terminal device according to the SFI, at least one of a slot format in one time unit and a time length suitable for the slot format includes:

determining, by the terminal device, a slot format in one slot according to the slot format index and a first corresponding relationship, where the first corresponding relationship is a corresponding relationship between the slot format index and the slot format.

Therefore, according to the SFI identification method in the embodiments of this application, it is not necessary to indicate a state of each symbol in one slot. Compared with a manner in which the state of each symbol in one slot is indicated, signaling overheads can be reduced.

Optionally, the first corresponding relationship may be preconfigured for the terminal device by the network device. For example, the network device may preconfigure the first corresponding relationship for the terminal device through semi-static signaling, or the first corresponding relationship may alternatively be preset in the terminal device.

With reference to the first aspect, in some implementations of the first aspect, the SFI includes number information of slots suitable for the slot format.

With reference to the first aspect, in some implementations of the first aspect, the determining, by the terminal device according to the SFI, at least one of a slot format in one time unit and a time length suitable for the slot format includes:

determining, by the terminal device, the number of slots suitable for the slot format according to a scrambling manner used for a downlink control message (DCI) that is used for carrying the SFI, and a second corresponding relationship, where the second corresponding relationship is a corresponding relationship between the scrambling manner used for the DCI that is used for carrying the SFI and the number of slots suitable for the slot format.

Optionally, the second corresponding relationship may be preconfigured for the terminal device by the network device. For example, the network device may preconfigure the second corresponding relationship for the terminal device through semi-static signaling, or the second corresponding relationship may alternatively be preset in the terminal device. This is not limited in the embodiments of this application.

With reference to the first aspect, in some implementations of the first aspect, the scrambling manner used for the DCI includes a mask and/or a radio network temporary identifier (RNTI) used for scrambling the DCI.

With reference to the first aspect, in some implementations of the first aspect, the detecting, by the terminal device, a PDCCH according to the slot format corresponding to the one of the one or more slot format indices indicated by the SFI includes:

detecting, by the terminal device, the PDCCH according to the slot format in K slots starting from a current slot or starting from an Lth slot after the current slot, where K is the number of slots suitable for the slot format, L is an integer greater than or equal to 1, and K is an integer greater than or equal to 1.

Therefore, the number of slots suitable for the slot format is indicated by using the SFI. In this way, it is not necessary to repeatedly send the SFI in several slots of the number of slots suitable for the slot format, so that signaling overheads can be reduced, and complexity of blindly detecting a PDCCH by the terminal device can also be reduced.

With reference to the first aspect, in some implementations of the first aspect, the time unit is a transmission period used for transmitting the DCI carrying the SFI, and the transmission period includes a plurality of slots.

With reference to the first aspect, in some implementations of the first aspect, the SFI is used to indicate a slot format corresponding to each slot in one transmission period.

With reference to the first aspect, in some implementations of the first aspect, the SFI includes number information of downlink symbols and/or number information of uplink symbols included in one slot, and the determining, by the terminal device according to the SFI, at least one of a slot format in one time unit and a time length suitable for the slot format includes:

determining, by the terminal device, M symbols starting from the first symbol in each slot as a time domain location used for downlink transmission in the slot, where M is the number of downlink symbols in the slot, and M is an integer greater than or equal to 0; and/or determining, by the terminal device, last N symbols in each slot as a time domain location used for uplink transmission in the slot, where M is the number of uplink symbols in the slot, and N is an integer greater than or equal to 0.

With reference to a first aspect, in some implementations of the first aspect, the SFI includes a slot format index of each slot in one transmission period, the slot format index has a third corresponding relationship with the slot format, and the determining, by the terminal device according to the SFI, at least one of a slot format in one time unit and a time length suitable for the slot format includes:

determining, by the terminal device, the slot format in each slot according to the slot format index of the slot, and the third corresponding relationship.

With reference to the first aspect, in some implementations of the first aspect, the SFI indicates the slot format corresponding to each slot in one transmission period by means of a bitmap.

With reference to the first aspect, in some implementations of the first aspect, the detecting, by the terminal device, a PDCCH according to the slot format corresponding to the one of the one or more slot format indices indicated by the SFI includes:

detecting, by the terminal device, the PDCCH in each transmission period according to the slot format corresponding to each slot in the transmission period.

With reference to the first aspect, in some implementations of the first aspect, the method further includes:

receiving, by the terminal device, configuration information sent by the network device, where the configuration information is used to configure the transmission period of the DCI used for carrying the SFI.

According to a second aspect, a data transmission method is provided. The method includes:

generating, by a network device, an SFI, where the SFI is used to indicate at least one of a slot format in one time unit and a time length suitable for the slot format:

sending, by the network device, the SFI to the terminal device.

With reference to the second aspect, in some implementations of the second aspect, the time unit is a slot.

With reference to the second aspect, in some implementations of the second aspect, the SFI is used to indicate number information of downlink symbols and/or number information of uplink symbols included in one slot.

With reference to the second aspect, in some implementations of the second aspect, the SFI is used to indicate a slot format index, and the slot format index and the slot format index has a first corresponding relationship with the slot format.

With reference to the second aspect, in some implementations of the second aspect, the SFI includes number information of slots suitable for the slot format.

With reference to the second aspect, in some implementations of the second aspect, a scrambling manner used for a DCI that is used for carrying the SFI has a second corresponding relationship with the number of slots suitable for the slot format.

With reference to the second aspect, in some implementations of the second aspect, the scrambling manner used for the DCI includes a mask and/or an RNTI used for scrambling the DCI.

With reference to the second aspect, in some implementations of the second aspect, the time unit is a transmission period used for transmitting the DCI carrying the SFI, and the transmission period includes a plurality of slots.

With reference to the second aspect, in some implementations of the second aspect, the SFI is used to indicate a slot format corresponding to each slot in one transmission period.

With reference to the second aspect, in some implementations of the second aspect, the SFI includes number information of downlink symbols and/or number information of uplink symbols included in one slot.

With reference to the second aspect, in some implementations of the second aspect, the SFI includes a slot format index of each slot in one transmission period, and the slot format index has a third corresponding relationship with the slot format.

With reference to the second aspect, in some implementations of the second aspect, the SFI indicates the slot format corresponding to each slot in one transmission period by means of a bitmap.

With reference to the second aspect, in some implementations of the second aspect, the method further includes:

sending, by the network device, configuration information to the terminal device where the configuration information is used to configure, for the terminal device, the transmission period of the DCI used for carrying the SFI.

According to a third aspect, a terminal device is provided. The terminal device is configured to perform the method according to any one of the first aspect or the possible implementations of the first aspect. Specifically, the terminal device includes units configured to perform the method according to any one of the first aspect or the possible implementations of the first aspect.

According to a fourth aspect, a network device is provided. The network device is configured to perform the method according to any one of the second aspect or the possible implementations of the second aspect. Specifically, the terminal device includes units configured to perform the method according to any one of the second aspect or the possible implementations of the second aspect.

According to a fifth aspect, a terminal device is provided. The terminal device includes: a memory, a processor, an input interface and an output interface. The memory, the processor, the input interface, and the output interface are connected by a bus system. The memory is configured to store an instruction, and the processor is configured to perform the instruction stored in the memory, to perform the method according to any one of the first aspect or the possible implementations of the first aspect.

According to a sixth aspect, a network device is provided. The network device includes: a memory, a processor, an input interface, and an output interface. The memory, the processor, the input interface, and the output interface are connected by a bus system. The memory is configured to store an instruction, and the processor is configured to perform the instruction stored in the memory, to perform the method according to any one of the second aspect or the possible implementations of the second aspect.

According to a seventh aspect, a computer storage medium is provided. The computer storage medium is configured to store a computer software instruction that is used to perform the method according to any one of the first aspect or the possible implementations of the first aspect, and the computer software instruction includes a program designed to perform the foregoing aspect.

According to an eighth aspect, a computer storage medium is provided. The computer storage medium is used to store a computer software instruction that is used to perform the method according to any one of the second aspect or the possible implementations of the second aspect, and the computer software instruction includes a program designed to perform the foregoing aspect.

According to a ninth aspect, a computer program product including an instruction is provided, and when the product is run on a computer, the computer is enabled to perform the method according to any one of the first aspect or the optional implementations of the first aspect.

According to a tenth aspect, a computer program product including an instruction is provided, and when the product is run on a computer, the computer is enabled to perform the method according to any one of the second aspect or the optional implementations of the second aspect.

BRIEF DESCRIPTION OF THE DRAWINGS

FIG. 5 is a schematic flowchart of a data transmission method according to another embodiment of this application.

FIG. 6 is a schematic block diagram of a terminal device according to an embodiment of this application:

FIG. 7 is a schematic block diagram of a network device according to an embodiment of this application;

DETAILED DESCRIPTION

The technical solutions in embodiments of this application are described below with reference to the accompanying drawings in the embodiments of this application.

The technical solutions of the embodiments of this application may be applied to various communications systems, for example: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), a Worldwide Interoperability for Microwave Access (WiMAX) communications system, or a future 5G system.

Figure 1:
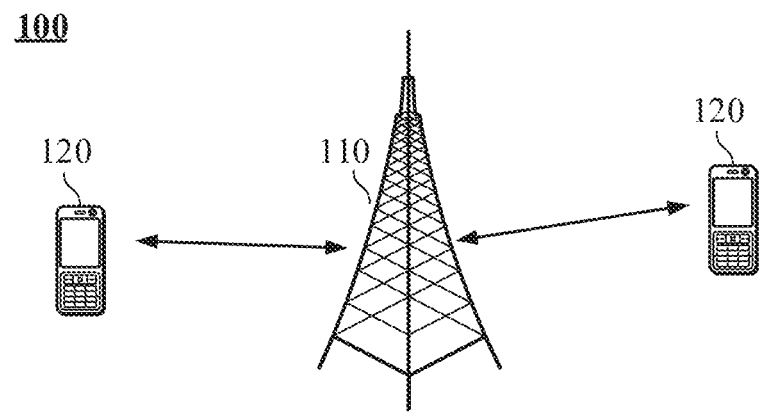
FIG. 1 is a schematic diagram of a communications system according to an embodiment of this application.

FIG. 1 shows a wireless communications system 100 applied to an embodiment of this application. The wireless communications system 100 may include a network device 110. The network device 100 may be a device communicating with a terminal device. The network device 100 can provide communication coverage for a particular geographical area, and can communicate with a terminal device (for example, UE) in the coverage. Optionally, the network device 100 may be a base transceiver station (BTS) in a GSM system or a CDMA system, a NodeB (NB) in a WCDMA system, an evolved NodeB (eNB or eNodeB) in an LTE system, or a wireless controller in a cloud radio access network (CRAN), or the network device may be a relay station, an access point, an in-vehicle device, a wearable device, or a network side device in a future 5G network or a network device in a future evolved Public Land Mobile Network (PLMN).

The wireless communications system 100 may further include at least one terminal device 120 in the coverage of the network device 110. The terminal device 120 may be movable or fixed. Optionally, the terminal device 120 may be an access device, user equipment (User Equipment, UE), a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network or a terminal device in a future evolved PLMN.

Optionally, the 5G system or network may also be referred to as a new radio (NR) system or network.

FIG. 1 shows one network device and two terminal devices as an example. Optionally, the wireless communications system 100 may include a plurality of network devices and another number of terminal devices may be included in coverage of each network device. This is not limited in this embodiment of this application.

Optionally, the wireless communications system 100 may further include other network entities such as a network controller and a mobility management entity. This is not limited in this embodiment of this application.

Figure 2:
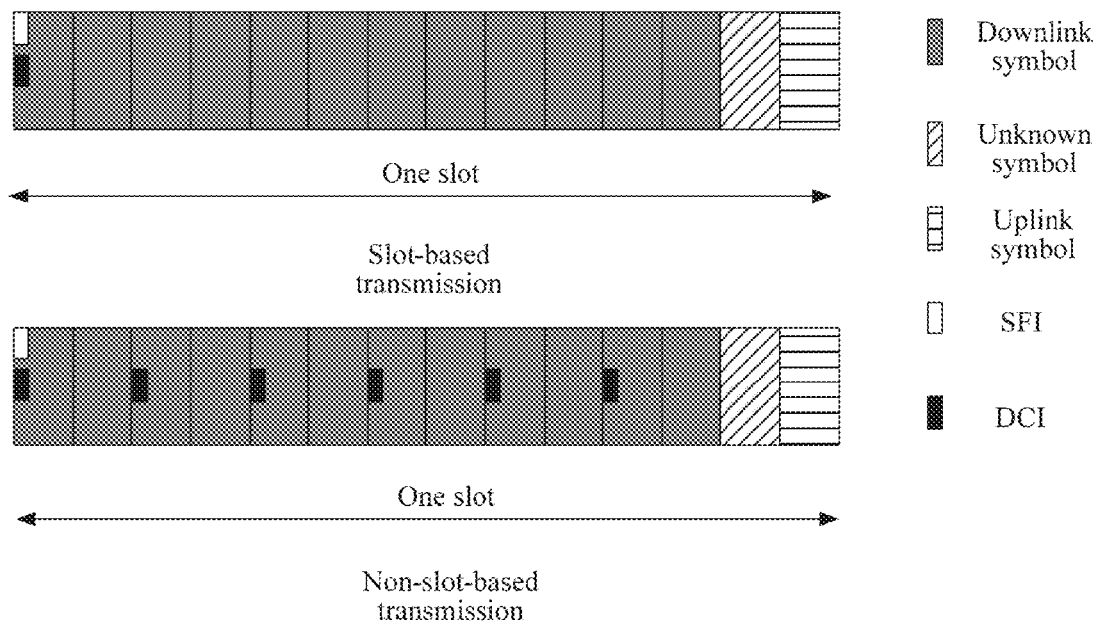
FIG. 2 is a schematic diagram of a slot-based data transmission manner and a non-slot-based data transmission manner.

In a slot in an NR system, a slot-based (slot-based) data transmission manner and a non-slot-based (non-slot-based) data transmission manner may be supported. As shown in FIG. 2, a difference between the two data transmission manners is: in the slot-based data transmission manner, a DCI used for scheduling data is located in the first three symbols of the slot, and the slot is used as a scheduling unit for scheduling; while in the non-slot-based data transmission manner, a DCI used for scheduling data may be located at any location of the slot, and one or more symbols is used as a unit for scheduling. For example, two, four, or seven symbols are used as the scheduling unit.

Figure 3:
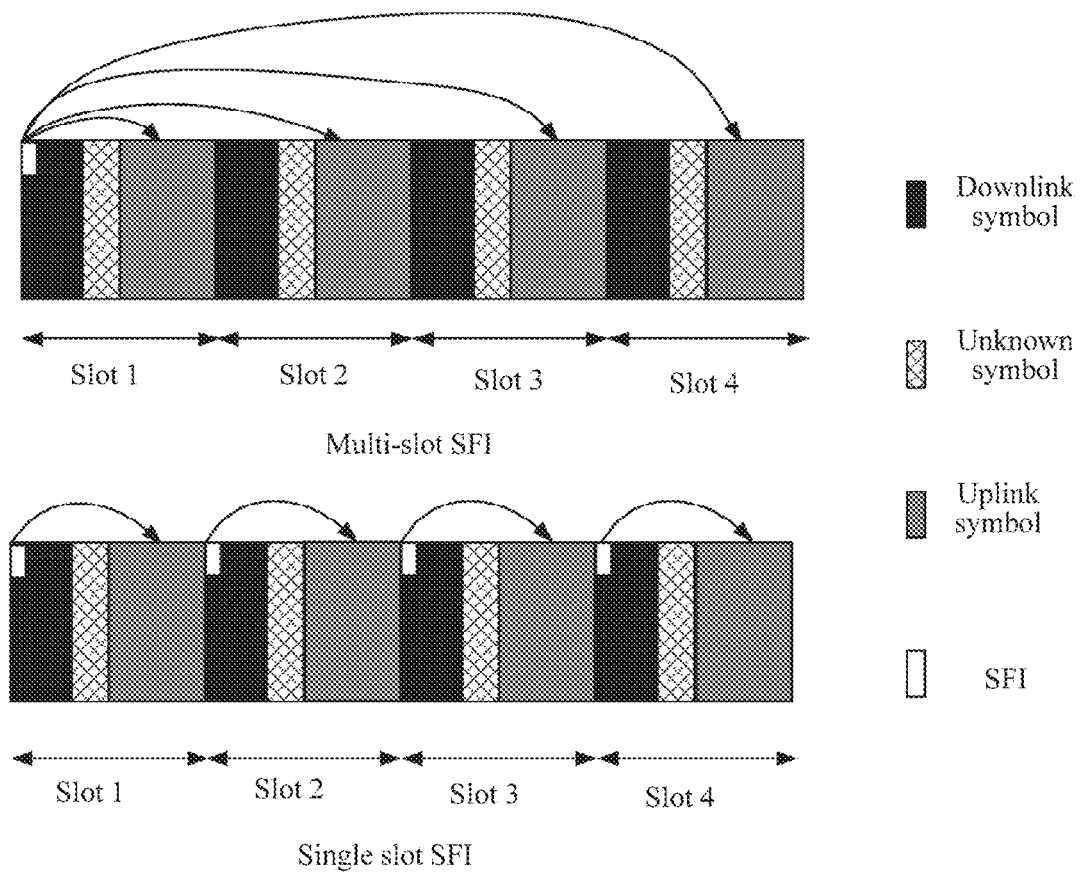
FIG. 3 is a schematic diagram of a multi-slot and a single slot SFI identification manner.

The NR system supports a multi-slot and a single slot SFI identification manner. FIG. 3 is a schematic diagram of the two identification manners.

In one slot, each symbol has many states. For example, a symbol may be a DL symbol, a UL symbol, or an unknown symbol. If two bits are used to represent a state of each symbol, 14 symbols in one slot need to be represented by using 28 bits. For the single slot SFI identification manner as shown in FIG. 3, an SFI received in Slot 1 may be used to indicate a slot format of Slot 1, and the SFI needs 28 bits. For the multi-slot SFI identification manner as shown in FIG. 3, an SFI received in Slot 1 may be used to indicate a slot format of Slot 1 to Slot 4, and then the SFI needs 28×4 bits to indicate slot formats of the four slots. Therefore, a large number of bits need to be occupied and different quantities of bits are required in the two indication manners, so that complexity of blindly detecting a PDCCH by the terminal device is increased in a certain degree.

In view of this, the embodiments of this application provide a data transmission method, by which SFI indication overheads can be reduced, and the complexity of blindly detecting the PDCCH by the terminal device can also be reduced.

Figure 4:
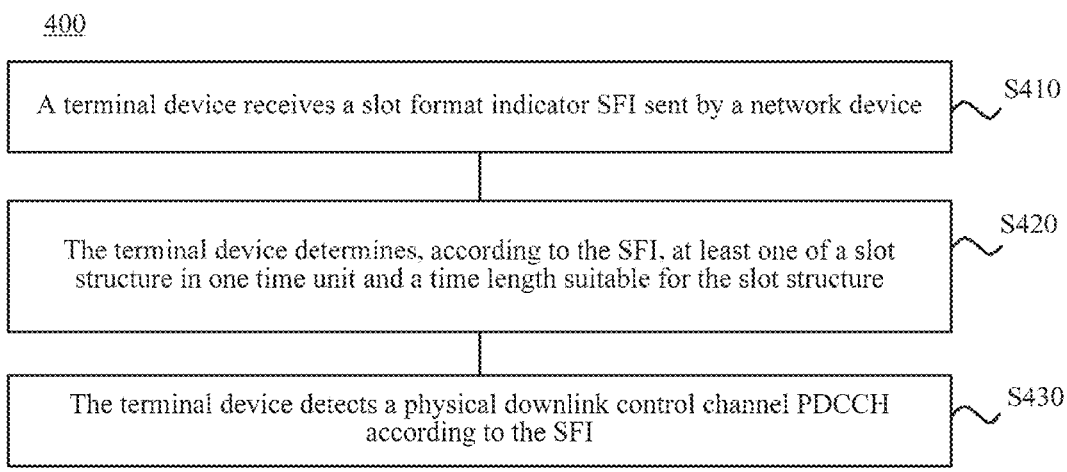
FIG. 4 is a schematic flowchart of a data transmission method according to an embodiment of this application.

FIG. 4 is a schematic flowchart of a data transmission method according to an embodiment of this application. As shown in FIG. 4, the method 400 can include:

S410. A terminal device receives an SFI sent by a network device.

S420. The terminal device determines, according to the SFI, at least one of a slot format in one time unit and a time length suitable for the slot format.

S430. The terminal device detects a PDCCH according to the slot format corresponding to the one of the one or more slot format indices indicated by the SFI.

It should be noted that, in this embodiment of this application, the time unit may be one or more slots, or may be one or more TTIs. This is not limited in this embodiment of this application.

Specifically, the terminal device may determine a slot format in one time unit according to the SFI, and may further determine a time length suitable for the slot format in the time unit. For example, the slot format in the time unit may be suitable for one or more time units. Optionally, if the time unit is one slot, the time length suitable for the slot format may be one or more slots. That is, in the one or more slots, the terminal device can detect a PDCCH according to the slot format. Optionally, the time unit may alternatively be a transmission period (where the transmission period may include a plurality of slots), so that the SFI can be used to indicate a slot format of each slot in the transmission period. In this case, the time length suitable for the slot format indicated by the SFI may be one or more transmission periods.

In other words, if a slot format in a time span is periodic, the slot format in a time unit and a time length suitable for the slot format in the time unit can be used for representation. For example, a slot format of one slot may be suitable for K (where K is an integer greater than or equal to 1) slots. That is, the slot format is periodic in the K slots, so that all the K slots can use the slot format of the slot. Alternatively, a slot format of N (where N is an integer greater than 1) slots may be suitable for N×M slots, where M is a positive integer, and every N slots in the N×M slots can use the slot format of the N slots.

Therefore, the SFI in this embodiment of this application is different from an existing SFI. The SFI can be used to not only indicate a slot format in one time unit, but also indicate a time length suitable for the slot format. In this way, the slot format can be used in several time units following a time unit (which can be a current time unit, or can be a time unit after the current time unit), and it is not necessary to send the SFI in the next several time units, so that signaling overheads can be reduced, and the complexity of blindly detecting the PDCCH by the terminal device can also be reduced.

With reference to specific embodiments, the SFI identification manner in the embodiments of this application will be described in detail below. It should be noted that, the following examples are intended to help a person skilled in the art to better understand the embodiments of this application, but not to limit the scope of the embodiments of this application. A person skilled in the art can obviously make various equivalent modifications or variations according to the following examples, and such modifications or variations may fall within the range of the embodiments of this application.

Embodiment 1

In this embodiment, the SFI is used to indicate number information of downlink symbols and/or number information of uplink symbols included in one slot. The number of downlink symbols included in one slot is marked as M, and the number of uplink symbols included in one slot is marked as N. M and N are both integers, $0 \le M \le X$, $0 \le N \le X$, $0 \le M+N \le X$, and X is a total number of symbols in one slot, for example, X=14. In this way, a number of bits required for representing the number of downlink symbols and the number of uplink symbols is eight bits at most. Therefore, according to the SFI identification method in this embodiment of this application, it is not necessary to indicate a state of each symbol in one slot. Compared with a manner in the prior art in which the state of each symbol in one slot is indicated (where 28 bits may be used for indication), signaling overheads can be reduced.

Optionally, the slot includes reserved symbols, and the reserved symbols are Y symbols starting from the first symbol of the slot, so that the number of DL symbols included in this slot and indicated by the SFI is M. and M symbols starting from the (Y+1)th symbol are the DL symbols. The number of UL symbols included in the slot and indicated by the SFI is N, and last N symbols are the UL symbols.

Optionally, the slot includes reserved symbols, and the reserved symbols are last Y symbols of the slot, so that the number of DL symbols included in the slot and indicated by the SFI is M, and M symbols starting from the first symbol are the DL symbols. The number of UL symbols included in the slot and indicated by the SFI is N, and N symbols ending at the (Y+1)th last symbol are the UL symbols.

Optionally, the SFI can indicate only the number of downlink symbols. In this way, the terminal device can determine M symbols following the first symbol as the DL symbols. Then, the terminal device can detect the PDCCH in the DL symbols. Optionally, when data needs to be transmitted, the terminal device can perform downlink transmission in the DL symbols scheduled by the PDCCH, or perform uplink transmission in the UL symbols scheduled by the PDCCH.

Optionally, the SFI can indicate the number of downlink symbols and the number of uplink symbols. In this way, the terminal device can determine M symbols following the first symbol as the DL symbols, and determine last N symbols as the UL symbols. Then, the terminal device can detect the PDCCH in the DL symbols. Optionally, when data needs to be transmitted, the terminal device can perform uplink transmission in the UL symbols.

In other words, the terminal device can obtain, according to the number information of downlink symbols and/or the number information of uplink symbols in one slot, a time domain location used for downlink transmission and a time domain location used for uplink transmission in one slot. Further, S430 may include:

detecting, by the terminal device, the PDCCH in the M symbols starting from the first symbol.

That is, the terminal device detects the PDCCH in the time domain location used for downlink transmission (namely, the DL symbols). Optionally, when data is to be transmitted, the terminal device can alternatively perform uplink transmission in the time domain location used for uplink transmission (namely, the UL symbols).

Embodiment 2

In this embodiment, the SFI is used to indicate a slot format index. For example, one time unit is one slot. There are N types of slot formats in one slot, and each slot format index can correspond to one slot format. The terminal device can learn a target slot format according to the slot format index. A number of bits required for indicating the slot format index is related to a total number of the slot formats. For example, for eight types of slot formats, the number of bits required by the slot format index may be 3, or for ten types of slot formats, the number of bits required by the slot format index may be 4. Therefore, according to the SFI identification method in this embodiment of this application, it is not necessary to indicate a state of each symbol in one slot. Compared with a manner in which the state of each symbol in one slot is indicated (where 28 bits may be used for indication), signaling overheads can be reduced.

In a specific embodiment, S420 may include:

determining, by the terminal device, a slot format in one slot according to the slot format index and a first corresponding relationship, where the first corresponding relationship is a corresponding relationship between the slot format index and the slot format.

In other words, the slot format index can have a first corresponding relationship with the slot format. The first corresponding relationship may be in the form of a table or in the form of a tree, and this is not limited in this embodiment of this application. After the terminal device receives the SFI, the terminal device may search for the first corresponding relationship according to the slot format index indicated by the SFI, and obtain the slot format corresponding to the slot format index. Then, the terminal device can blindly detect the PDCCH according to the slot format.

Optionally, the first corresponding relationship may be preconfigured for the terminal device by the network device. For example, the network device may preconfigure the first corresponding relationship for the terminal device through semi-static signaling, or the first corresponding relationship may alternatively be preset in the terminal device. This is not limited in this embodiment of this application.

By way of example and not limitation, the first corresponding relationship may be shown as Table 1:

TABLE 1

| SFI index | Number of DL symbols | Number of unknown symbols | Number of UL symbols |
|---|---|---|---|
| 0 | 12 | 1 | 1 |
| 1 | 11 | 1 | 2 |
| 2 | 10 | 1 | 3 |
| 3 | 10 | 3 | 1 |
| 4 | 9 | 3 | 2 |
| 5 | 1 | 1 | 12 |
| 6 | 2 | 1 | 11 |
| 7 | 3 | 1 | 10 |

For example, if the slot format index indicated by the SFI is 4, the terminal device can determine, according to Table 1, that in the slot format corresponding to the slot format index, namely, 4, the number of DL symbols is 9, a number of unknown symbols is 3, and the number of UL symbols is 2. Further, the terminal device can determine that nine symbols starting from the first symbol (that is, Symbol 0 to Symbol 8) are the DL symbols, three symbols starting from Symbol 9 (that is, Symbol 9 to Symbol 11) are the unknown symbols, and Symbol 12 and Symbol 13 are the UL symbols. In this way, the terminal device can detect the PDCCH in Symbol 0 to Symbol 8. When data needs to be transmitted, the terminal device can alternatively perform uplink transmission in Symbol 12 and Symbol 13.

After the terminal device determines the slot format in one slot according to Embodiment 1 and Embodiment 2, the terminal device can further perform data transmission in a slot-based data transmission manner or a non-slot-based data transmission manner.

It should be understood that, the terminal device can perform multi-slot or single slot indication in the identification manner described in Embodiment 1 or Embodiment 2 to. For example, the SFI may include one slot format index, to indicate a slot format in one slot, or may include a slot format of a plurality of slots, to indicate the slot format in the plurality of slot; or the SFI may include the number information of downlink symbols and/or uplink symbols included in one slot, or the SFI may include number information of downlink symbols and/or uplink symbols included in each slot in a plurality of slots.

With reference to Embodiment 1 and Embodiment 2, the foregoing introduces how the SFI indicates a slot format. With reference to Embodiment 3 and Embodiment 4, the following will introduce how the terminal device indicates a time length suitable for the slot format.

It should be understood that, in Embodiment 3 and Embodiment 4, the SFI can be used to indicate the slot format in one slot. For example, the manner described in Embodiment 1 or Embodiment 2 can be used to indicate the slot format in one slot, or the existing identification manner can be used to indicate the slot format in one slot. This is not limited in this embodiment of this application.

Embodiment 3

In this embodiment, the SFI may include number information of slots suitable for the slot format, that is, the SFI may further be used to indicate the number of slots suitable for the slot format. For example, the SFI may include a slot number indication domain. For example, the slot number indication domain may be three bits. The SFI may indicate that the number of slots suitable for the slot format may be 8 at most. In this way, in the number of slots suitable for the slot format, it is not necessary to repeatedly send the SFI, so that signaling overheads can be reduced, and complexity of blindly detecting a PDCCH by the terminal device can also be reduced.

In other words, the terminal device can determine, according to Embodiment 1 and Embodiment 3, or Embodiment 2 and Embodiment 3, or a slot format identification manner in the prior art and Embodiment 3, a slot format in one slot and a number of slots suitable for the slot format. In this way, the SFI includes at least two indication domains. One indication domain is used to indicate a slot format in one slot. The slot format may be indicated in the manner described in Embodiment 1 or Embodiment 2, or may be indicated in the existing identification manner. The indication domain is suitable for the slot-based data transmission manner and the non-slot-based data transmission manner. The other indication domain is used to indicate a number of slots suitable for the slot format, that is, the SFI in this embodiment of this application can also be suitable for the multi-slot indication and the single slot indication.

Embodiment 4

In this embodiment, a scrambling manner used for a DCI that is used for carrying the SFI may be used to indirectly indicate the number of slots suitable for the slot format.

In a specific embodiment, S420 may include:

determining, by the terminal device, the number of slots suitable for the slot format according to a scrambling manner used for a DCI that is used for carrying the SFI, and a second corresponding relationship, where the second corresponding relationship is a corresponding relationship between the scrambling manner used for the DCI that is used for carrying the SFI and the number of slots suitable for the slot format.

In other words, the scrambling manner used for the DCI that is used for carrying the SFI may have a second corresponding relationship with the slot format. The second corresponding relationship may be in the form of a table or in the form of a tree, and this is not limited in this embodiment of this application. After receiving the DCI used for carrying the SFI, the terminal device can determine a slot format corresponding to the scrambling manner according to the scrambling manner used for the DCI and with reference to the second corresponding relationship. Further, the terminal device can blindly detect the PDCCH according to the slot format.

Optionally, the second corresponding relationship may be preconfigured for the terminal device by the network device. For example, the network device may preconfigure the second corresponding relationship for the terminal device through semi-static signaling, or the second corresponding relationship may alternatively be preset in the terminal device. This is not limited in this embodiment of this application.

Optionally, the scrambling manner used for the DCI includes a mask and/or an RNTI used for scrambling the DCI. That is, the terminal device can determine the corresponding slot format according to the mask and/or the RNTI corresponding to the DCI.

A specific process is as follows:

Information bits of the DCI can be represented as: $a_0$, $a_1$, $a_2$, $a_3$, ... $a_{A-1}$, and CRC check bits are $P_0$, $P_1$, $P_2$, $P_3$, ... $P_{L-1}$. A represents an information bit length, and L represents a check bit length. A bit sequence on which CRC is performed is represented as $b_0$, $b_1$, $b_2$, $b_3$, ... $P_{B-1}$, where B=A+L. For k=0, 1, 2, ..., A−1, $b_k=a_k$; and for k=A. A+1, A+2, .... A+L−1, $b_k=P_{k-A}$.

Scrambling and masking are processed on the sequence on which CRC is performed. A scrambling code sequence is determined by a corresponding RNTI, that is, $x_{rnti,0}$, $x_{rnti,1}$, ..., $x_{rnti,15}$. The mask herein is a scrambling code sequence $x_{mask}$ provided in Table 2. A sequence obtained after the scrambling and masking is $c_0$, $c_1$, $c_2$, $c_3$, ..., $c_{B-1}$. For k=0, 1, 2, ..., A−1, $c_k=b_k$ and for k=A, A+1, A+2, .... A+15, $c_k=(b_k+x_{rnti,k-A}+x_{mask,k-A})$mod 2. The terminal device performs decoding according to the received DCI, and can learn the mask and the RNTI used for scrambling the DCI. Then, with reference to the second corresponding relationship, the number of slots suitable for the slot format can be determined.

By way of example and not limitation, the second corresponding relationship may be shown as Table 2:

TABLE 2

| Mask⟨$x_{mask,0}$, $x_{mask,1}$, ..., $x_{mask,15}$⟩ | Number of slots suitable for the slot format |
|---|---|
| <0, 0, 0, 0, 0, 0, 0, 0, 0, 0, 0, 0, 0, 0, 0, 0> | 1 |
| <0, 1, 0, 1, 0, 1, 0, 1, 0, 1, 0, 1, 0, 1, 0, 1> | 2 |
| <1, 0, 1, 0, 1, 0, 1, 0, 1, 0, 1, 0, 1, 0, 1, 0> | 3 |
| <1, 1, 1, 1, 1, 1, 1, 1, 1, 1, 1, 1, 1, 1, 1, 1> | 4 |

For example, if the mask used for the DCI used for carrying the SFI is <1, 0, 1, 0, 1, 0, 1, 0, 1, 0, 1, 0, 1, 0>, the terminal device can determine that the number of slots suitable for the slot format and indicated by the SFI is 3.

Therefore, the number of slots suitable for the slot format can be determined according to Embodiment 3 and Embodiment 4. Further, S430 may specifically include:

detecting, by the terminal device, the PDCCH according to the slot format in K slots starting from a current slot or starting from an Lth slot after the current slot, where K is the number of slots suitable for the slot format, L is an integer greater than or equal to 1, and K is an integer greater than or equal to 1.

That is, the terminal device can detect the PDCCH according to the slot format in the following K slots starting from the current slot, or starting from an Lth slot after the current slot. That is, it is not necessary to repeatedly send the SFI in the K slots, so that signaling overheads can be reduced, and the complexity of blindly detecting the PDCCH by the terminal device can also be reduced.

Therefore, the terminal device can determine, according to Embodiment 1 and Embodiment 4, or Embodiment 2 and Embodiment 4, or a slot format identification manner in the prior art and Embodiment 4, a slot format in one slot and a number of slots suitable for the slot format. In this way, the SFI includes at least one indication domains. One indication domain is used to indicate a slot format in one slot. The slot format may be indicated in the manner described in Embodiment 1 or Embodiment 2, or may be indicated in the existing identification manner. The indication domain is suitable for the slot-based data transmission manner and the non-slot-based data transmission manner. The number of slots suitable for the slot format can be indicated in the identification manner described in Embodiment 4, that is, the number of slots suitable for the slot format can be indirectly indicated in the scrambling manner used for the DCI that is used for carrying the SFI.

With reference to Embodiment 5, the following introduces an SFI identification manner by using an example in which one time unit is a transmission period used to transmit the DCI used for carrying the SFI. In this embodiment, the transmission period includes a plurality of slots. The SFI is used to indicate a slot format corresponding to each slot in one transmission period, and for the slot format of each slot, refer to the identification manners in the foregoing embodiments. For brevity, a specific implementation is not repeatedly described.

Optionally, in an embodiment, the SFI includes number information of downlink symbols and/or number information of uplink symbols included in one slot. In this case, S420 may include:

determining, by the terminal device, M symbols starting from the first symbol in each slot as a time domain location used for downlink transmission in the slot, where M is the number of downlink symbols in the slot, and M is an integer greater than or equal to 0; and/or determining, by the terminal device, last N symbols in each slot as a time domain location used for uplink transmission in the slot, where M is the number of uplink symbols in the slot, and N is an integer greater than or equal to 0.

In other words, the terminal device can determine the slot format of the each slot according to number information of downlink symbols and/or number information of uplink symbols included in each slot in one transmission period. Further, in each transmission period, the terminal device can detect the PDCCH according to the slot format of each slot.

For example, if one transmission period includes four slots, the first slot in the transmission period includes eight downlink symbols, the second slot includes nine downlink symbols, the third slot includes ten downlink symbols, and the fourth slot includes nine downlink symbols, then in each transmission period, the terminal device detects the PDCCH in the first eight symbols of the first slot, detects the PDCCH in the first nine symbols of the second slot, detects the PDCCH in the first ten symbols of the third slots, and detects the PDCCH in the first nine symbols of the fourth slot, until a time length suitable for the slot format is invalid. Optionally, in another embodiment, the SFI includes a slot format index of each slot in one transmission period, the slot format index has a third corresponding relationship with the slot format, and the determining, by the terminal device according to the SFI, at least one of a slot format in one time unit and a time length suitable for the slot format includes:

determining, by the terminal device, the slot format in each slot according to the slot format index of the slot, and the third corresponding relationship.

In other words, with reference to the third corresponding relationship, the terminal device can determine the slot format of each slot in one period according to the slot format index of the slot in one transmission period. Further, in each transmission period, the terminal device can detect the PDCCH according to the slot format of the slot.

Optionally, the third corresponding relationship may be the same as or may be different from the foregoing first corresponding relationship. Assuming that the third corresponding relationship can also be the corresponding relationship as shown in Table 1, if one transmission period includes four slots, and slot format indexes of the four slots are respectively 4, 2, 3, and 2, the terminal device can determine the slot format corresponding to each slot according to the slot format index of the slot described above: and can further detect the PDCCH according to the slot format of the slot. Therefore, the complexity of blindly detecting the PDCCH can be reduced.

In a specific embodiment, the SFI indicates the slot format corresponding to each slot in one transmission period by means of a bitmap.

Optionally, in some embodiments, the method 400 further includes:

receiving, by the terminal device, configuration information sent by the network device, where the configuration information is used to configure the transmission period of the DCI used for carrying the SFI.

For example, the network device can configure the transmission period for the terminal device through semi-static signaling (for example, RRC signaling). In this way, when the transmission period remains unchanged, the terminal device can detect the PDCCH in each transmission period according to the slot format of each slot, so that the complexity of blindly detecting the PDCCH can be reduced.

With reference to FIG. 4, the foregoing describes the data transmission method according to this embodiment of this application from the perspective of a terminal device. With reference to FIG. 5, the following will describe a data transmission method in detail according to another embodiment of this application from the perspective of a network device. It should be understood that, the description of the network device side corresponds to the description of the terminal device side, and for a similar description, refer to the foregoing description. To avoid repetition, details are not described herein again.

FIG. 5 is a schematic flowchart of the data transmission method according to the another embodiment of this application. As shown in FIG. 5, the method 500 can include:

S510. A network device generates an SFI, where the SFI is used to indicate at least one of a slot format in one time unit and a time length suitable for the slot format;

S520. The network device sends the SFI to the terminal device.

Optionally, in some embodiments, the time unit is one slot.

Optionally, in some embodiments, the SFI is used to indicate number information of downlink symbols and/or number information of uplink symbols included in one slot.

Optionally, in some embodiments, the SFI is used to indicate a slot format index, and the slot format index has a first corresponding relationship with the slot format.

Optionally, in some embodiments, the SFI includes number information of slots suitable for the slot format.

Optionally, in some embodiments, a scrambling manner used for a DCI that is used for carrying the SFI has a second corresponding relationship with the number of slots suitable for the slot format.

Optionally, in some embodiments, the scrambling manner used for the DCI includes a mask and/or an RNTI used for scrambling the DCI.

Optionally, in some embodiments, the time unit is a transmission period used for transmitting the DCI carrying the SFI, and the transmission period includes a plurality of slots.

Optionally, in some embodiments, the SFI is used to indicate a slot format corresponding to each slot in one transmission period.

Optionally, in some embodiments, the SFI includes number information of downlink symbols and/or number information of uplink symbols included in one slot.

Optionally, in some embodiments, the SFI includes a slot format index of each slot in one transmission period, and the slot format index has a third corresponding relationship with the slot format.

Optionally, in some embodiments, the SFI indicates the slot format corresponding to each slot in one transmission period by means of a bitmap.

Optionally, in some embodiments, the method 500 further includes:

sending, by the network device, configuration information to the terminal device where the configuration information is used to configure, for the terminal device, the transmission period of the DCI used for carrying the SFI.

With reference to FIG. 4 and FIG. 5, the foregoing describes in detail the method embodiments of this application. With reference to FIG. 6 to FIG. 9, the following will describes in detail device embodiments of this application. It should be understood that, the device embodiments correspond to the method embodiments, and for a similar description, refer to the method embodiments.

FIG. 6 is a schematic block diagram of a terminal device 600 according to an embodiment of this application. As shown in FIG. 6, the terminal device 600 includes:

a communications module 610, configured to receive an SFI sent by a network device: and a determining module 620, configured to determine, according to the SFI, at least one of a slot format in one time unit and a time length suitable for the slot format, where the communications module 610 is further configured to detect a PDCCH according to the slot format corresponding to the one of the one or more slot format indices indicated by the SFI.

Optionally, in some embodiments, the time unit is one slot.

Optionally, in some embodiments, the SFI is used to indicate number information of downlink symbols and/or number information of uplink symbols included in one slot, and the determining module 620 is specifically configured to:

determine M symbols starting from the first symbol in one slot as a time domain location used for downlink transmission, where M is the number of downlink symbols, and M is an integer greater than or equal to 0; and/or determine last N symbols in one slot as a time domain location used for uplink transmission, where N is the number of uplink symbols, and N is an integer greater than or equal to 0.

Optionally, in some embodiments, the communications module 610 is specifically configured to:

detect the PDCCH in the M symbols starting from the first symbol.

Optionally, in some embodiments, the SFI is used to indicate the slot format index, and the determining module 620 is specifically configured to:

determine, a slot format in one slot according to the slot format index and a first corresponding relationship, where the first corresponding relationship is a corresponding relationship between the slot format index and the slot format.

Optionally, in some embodiments, the SFI includes number information of slots suitable for the slot format.

Optionally, in some embodiments, the determining module 620 is specifically configured to:

determine the number of slots suitable for the slot format according to a scrambling manner used for a DCI that is used for carrying the SFI, and a second corresponding relationship, where the second corresponding relationship is a corresponding relationship between the scrambling manner used for the DCI that is used for carrying the SFI and the number of slots suitable for the slot format.

Optionally, in some embodiments, the scrambling manner used for the DCI includes a mask and/or an RNTI used for scrambling the DCI.

Optionally, in some embodiments, the communications module 610 is specifically configured to:

detect the PDCCH according to the slot format in K slots starting from a current slot or starting from an Lth slot after the current slot, where K is the number of slots suitable for the slot format, L is an integer greater than or equal to 1, and K is an integer greater than or equal to 1.

Optionally, in some embodiments, the time unit is a transmission period used for transmitting the DCI carrying the SFI, and the transmission period includes a plurality of slots.

Optionally, in some embodiments, the SFI is used to indicate a slot format corresponding to each slot in one transmission period.

Optionally, in some embodiments, the SFI includes number information of downlink symbols and/or number information of uplink symbols included in one slot, and the determining module 620 is specifically configured to:

determine M symbols starting from the first symbol in each slot as a time domain location used for downlink transmission in the slot, where M is the number of downlink symbols in the slot, and M is an integer greater than or equal to 0; and/or determine last N symbols in each slot as a time domain location used for uplink transmission in the slot, where M is the number of uplink symbols in the slot, and N is an integer greater than or equal to 0.

Optionally, in some embodiments, the SFI includes a slot format index of each slot in one transmission period, and the slot format index has a third corresponding relationship with the slot format, and the determining module 620 is specifically configured to:

determine the slot format in each slot according to the slot format index of the slot, and the third corresponding relationship.

Optionally, in some embodiments, the SFI indicates the slot format corresponding to each slot in one transmission period by means of a bitmap.

Optionally, in some embodiments, the communications module 610 is specifically configured to:

detect the PDCCH in each transmission period according to the slot format corresponding to each slot in the transmission period.

Optionally, in some embodiments, the communications module 610 is further configured to:

receive configuration information sent by the network device, where the configuration information is used to configure the transmission period of the DCI used for carrying the SFI.

It should be understood that, the terminal device 600 in this embodiment of this application may correspond to the terminal device in the method embodiments of this application, and the foregoing and other operations and/or functions of the units in the terminal device 600 are for the purpose of respectively implementing corresponding procedures of the terminal device in the method 400 shown in FIG. 4. For brevity, details are not described herein again.

FIG. 7 is a schematic block diagram of a network device 700 according to an embodiment of this application. As shown in FIG. 7, the network device 700 includes:

a generation module 710, configured to generate an SFI, where the SFI is used to indicate at least one of a slot format in one time unit and a time length suitable for the slot format; and a communications module 720, configured to send the SFI to the terminal device.

Optionally, in some embodiments, the time unit is one slot.

Optionally, in some embodiments, the SFI is used to indicate number information of downlink symbols and/or number information of uplink symbols included in one slot.

Optionally, in some embodiments, the SFI is used to indicate a slot format index, and the slot format index has a first corresponding relationship with the slot format.

Optionally, in some embodiments, the SFI includes number information of slots suitable for the slot format.

Optionally, in some embodiments, a scrambling manner used for a DCI that is used for carrying the SFI has a second corresponding relationship with the number of slots suitable for the slot format.

Optionally, in some embodiments, the scrambling manner used for the DCI includes a mask and/or an RNTI used for scrambling the DCI.

Optionally, in some embodiments, the time unit is a transmission period used for transmitting the DCI carrying the SFI, and the transmission period includes a plurality of slots.

Optionally, in some embodiments, the SFI is used to indicate a slot format corresponding to each slot in one transmission period.

Optionally, in some embodiments, the SFI includes number information of downlink symbols and/or number information of uplink symbols included in one slot.

Optionally, in some embodiments, the SFI includes a slot format index of each slot in one transmission period, and the slot format index has a third corresponding relationship with the slot format.

Optionally, in some embodiments, the SFI indicates the slot format corresponding to each slot in one transmission period by means of a bitmap.

Optionally, in some embodiments, the communications module 720 is further configured to:

send configuration information to the terminal device, where the configuration information is used to configure, for the terminal device, the transmission period of the DCI for carrying the SFI.

It should be understood that, the network device 700 in this embodiment of this application may correspond to the network device in the method embodiments of this application, and the foregoing and other operations and/or functions of the units in the network device 700 are for the purpose of respectively implementing corresponding procedures of the network device in the method 500 shown in FIG. 5. For brevity, details are not described herein again.

Figure 8:
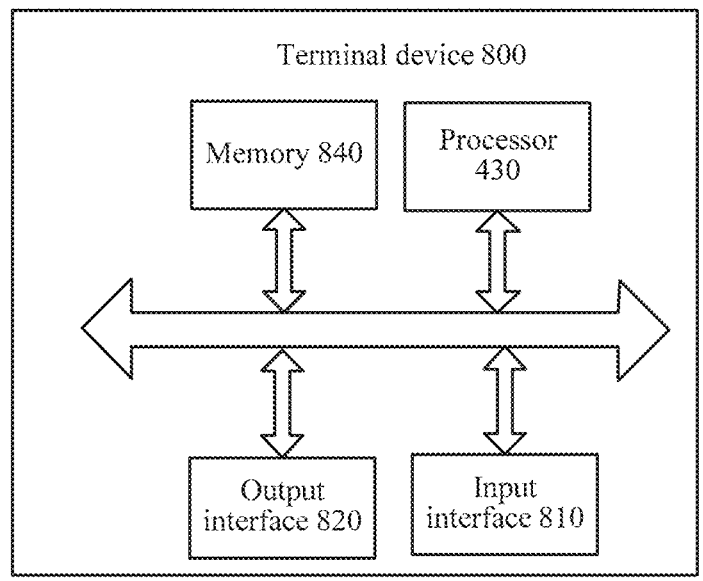
FIG. 8 is a schematic block diagram of a terminal device according to another embodiment of this application.

As shown in FIG. 8, an embodiment of the present invention further provides a terminal device 800. The terminal device 800 may be the terminal device 600 in FIG. 6, and can be configured to perform the corresponding content of the terminal device in the method 400 in FIG. 4. The terminal device 800 includes: an input interface 810, an output interface 820, a processor 830, and a memory 840, and the input interface 810, the output interface 820, the processor 830, and the memory 840 may be connected by using a bus system. The memory 840 is configured to store, for example, a program, an instruction, or code. The processor 830 is configured to execute the program, the instruction, or the code in the memory 840, to control the input interface 810 to receive a signal and control the output interface 820 to send a signal, to complete the operations in the foregoing method embodiments.

It should be understood that, in this embodiment of this application, the processor 830 may be a central processing unit (CPU), or the processor 830 may be another general processor, a digital signal processor (DSP), an application-specific integrated circuit (ASIC), a field-programmable gate array (FPGA) or another programmable logic device, a discrete gate or transistor logic device, a discrete hardware component, and the like. The general purpose processor may be a microprocessor or the processor may be any conventional processor.

The memory 840 may include a read-only memory and a random access memory, and provides the processor 830 with data and an instruction. A part of the memory 840 may further include a non-volatile random access memory. For example, the memory 840 may further store device type information.

In an implementation process, each piece of content of the foregoing methods may be implemented by a hardware-integrated logic circuit in the processor 830 or by an instruction in a software form. The content of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, or electrically erasable programmable memory, or a register. The storage medium is located in the memory 840, and the processor 830 reads information in the memory 840 and completes the content in the foregoing methods in combination with hardware of the processor. To avoid repetition, details are not described herein again.

In a specific implementation, the communications module 610 in the terminal device 600 shown in FIG. 6 may be implemented by the input interface 810 and the output interface 820 in FIG. 8, and the determining module 620 in the terminal device 600 shown in FIG. 6 may be implemented by the processor 830 in FIG. 8.

Figure 9:
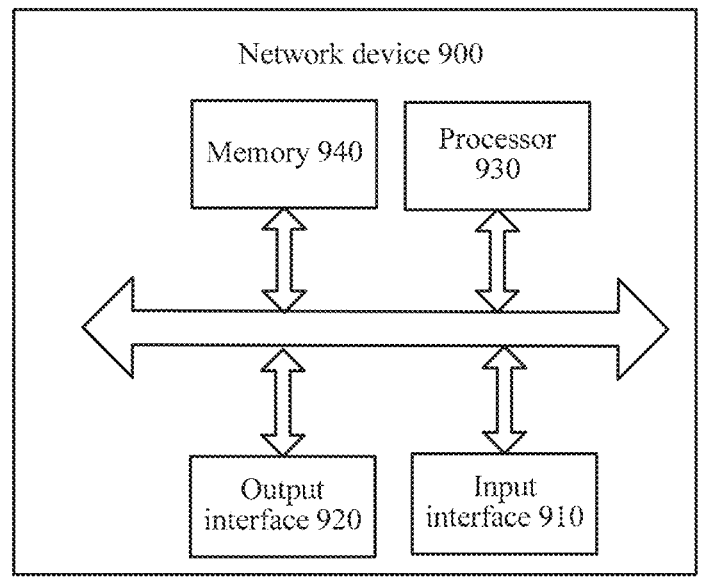
FIG. 9 is a schematic block diagram of a network device according to another embodiment of this application.

As shown in FIG. 9, an embodiment of the present invention further provides a network device 900. The network device 900 may be the network device 700 in FIG. 7, and can be configured to perform the corresponding content of the network device in the method 500 in FIG. 5. The network device 900 includes: an input interface 910, an output interface 920, a processor 930, and a memory 940, and the input interface 910, the output interface 920, the processor 930, and the memory 940 may be connected by using a bus system. The memory 940 is configured to store, for example, a program, an instruction, or code. The processor 930 is configured to execute the program, the instruction, or the code in the memory 940, to control the input interface 910 to receive a signal and control the output interface 920 to send a signal, to complete the operations in the foregoing method embodiments.

It should be understood that, in this embodiment of this application, the processor 930 may be a central processing unit (CPU): or the processor 930 may be another general processor, a digital signal processor (DSP), an application-specific integrated circuit (ASIC), a field-programmable gate array (FPGA) or another programmable logic device, a discrete gate or transistor logic device, a discrete hardware component, and the like. The general purpose processor may be a microprocessor or the processor may be any conventional processor.

The memory 940 may include a read-only memory and a random access memory, and provides the processor 930 with data and an instruction. A part of the memory 940 may further include a non-volatile random access memory. For example, the memory 940 may further store device type information.

In an implementation process, each piece of content of the foregoing methods may be implemented by a hardware-integrated logic circuit in the processor 930 or by an instruction in a software form. The content of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, or electrically erasable programmable memory, or a register. The storage medium is located in the memory 940, and the processor 930 reads information in the memory 940 and completes the content in the foregoing methods in combination with hardware of the processor. To avoid repetition, details are not described herein again.

In a specific implementation, the communications module 720 in the network device 700 shown in FIG. 7 may be implemented by the input interface 910 and the output interface 920 in FIG. 9, and the generation module 710 in the network device 700 shown in FIG. 7 may be implemented by the processor 930 in FIG. 9.

It should be understood that the term "and/or" in this specification describes only an association relationship for describing associated objects and represents that three relationships may exist. For example, A and/or B may represent the following three cases: Only A exists, both A and B exist, and only B exists. In addition, the character "I" in this specification generally indicates an "or" relationship between the associated objects.

It should be understood that sequence numbers of the foregoing processes do not mean execution sequences in various embodiments of the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely used as an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes various media that can store program code, for example: a USB flash drive, a removable hard disk, a read-only memory (ROM, Read-Only Memory), a random access memory (RAM, Random Access Memory), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for processing data in a wireless communication network, comprising:
    obtaining, by a terminal device, a slot format indicator (SFI), the SFI being used to indicate one or more slot format indices;
    obtaining, by the terminal device, one or more slot format indices according to the SFI;
    determining, by the terminal device, a slot format in a time unit according to one of the one or more slot format indices and a first correspondence relationship, wherein the first correspondence relationship is a relationship between a slot format index and a slot format; and
    receiving, by the terminal device, a physical downlink control channel (PDCCH) according to the slot format corresponding to the one of the one or more slot format indices indicated by the SFI, wherein the SFI is carried in downlink control information (DCI) and the DCI is scrambled by using a radio network temporary identifier (RNTI).

2. The method according to claim 1, wherein the time unit is a slot.

3. The method according to claim 2, wherein the determining, by the terminal device, a slot format in a time unit according to one of the one or more slot format indices and a first correspondence relationship, comprises:
    determining, by the terminal device, M symbols starting from a beginning in a slot as a time domain location used for downlink transmission, wherein M is the number of downlink symbols, and M is an integer greater than or equal to 0; and/or
    determining, by the terminal device, last N symbols from an end in a slot as a time domain location used for uplink transmission, wherein N is the number of uplink symbols, and N is an integer greater than or equal to 0.

4. The method according to claim 1, wherein the time unit is a transmission period used for transmitting the DCI carrying the SFI, and the transmission period comprises a plurality of slots.

5. The method according to claim 4, wherein the one or more slot format indices correspond to a slot format of each slot in a transmission period.

6. The method according to claim 5, wherein the determining, by the terminal device, a slot format in a time unit according to one of the one or more slot format indices and a first correspondence relationship, comprises:
    determining, by the terminal device, M symbols starting from a first symbol in each slot in the transmission period as a time domain location used for downlink transmission in the slot, wherein M is the number of downlink symbols in the slot, and M is an integer greater than or equal to 0; and/or
    determining, by the terminal device, last N symbols in each slot as a time domain location used for uplink transmission in the slot in the transmission period, wherein M is the number of uplink symbols in the slot, and N is an integer greater than or equal to 0;
    wherein M can be different for different slots in the transmission period, and N can be different for different slots in the transmission period.

7. The method according to claim 1, wherein the receiving, by the terminal device, a PDCCH according to the slot format corresponding to the one of the one or more slot format indices indicated by the SFI comprises:
    receiving, by the terminal device, the PDCCH in the M symbols starting from a first symbol in the time unit.

8. The method according to claim 7, further comprising:
    receiving, by the terminal device, configuration information sent by a network device, wherein the configuration information is used to configure the transmission period of DCI used for carrying the SFI.

9. A terminal device in a communication device, comprising:
    a processor and memory storing program instructions; wherein the program instructions, when executed by the processor, cause the terminal device to:
    obtain a slot format indicator (SFI), the SFI being used to indicate one or more slot format indices;
    obtain one or more slot format indices according to the SFI;
    determine a slot format in a time unit according to one of the one or more slot format indices and a first correspondence relationship, wherein the first correspondence relationship is a relationship between a slot format index and a slot format; and
    receive a physical downlink control channel (PDCCH) according to the slot format corresponding to the one of the one or more slot format indices indicated by the SFI, wherein the SFI is carried in downlink control information (DCI) and the DCI is scrambled by using a radio network temporary identifier (RNTI).

10. The terminal device according to claim 9, wherein the time unit is a slot.

11. The terminal device according to claim 10, wherein the instruction to determine a slot format in a time unit according to one of the one or more slot format indices and a first correspondence relationship, comprises:
    determine M symbols starting from a beginning in a slot as a time domain location used for downlink transmission, wherein M is the number of downlink symbols, and M is an integer greater than or equal to 0; and/or
    determine last N symbols from an end in a slot as a time domain location used for uplink transmission, wherein N is the number of uplink symbols, and N is an integer greater than or equal to 0.

12. The terminal device according to claim 9, wherein the time unit is a transmission period used for transmitting the DCI carrying the SFI, and the transmission period comprises a plurality of slots.

13. The terminal device according to claim 12, wherein the one or more slot format indices correspond to a slot format of each slot in a transmission period.

14. The terminal device according to claim 13, wherein the instruction to determine a slot format in a time unit according to one of the one or more slot format indices and a first correspondence relationship, comprises:
    determine M symbols starting from a first symbol in each slot in the transmission period as a time domain location used for downlink transmission in the slot, wherein M is the number of downlink symbols in the slot, and M is an integer greater than or equal to 0; and/or
    determine last N symbols in each slot as a time domain location used for uplink transmission in the slot in the transmission period, wherein M is the number of uplink symbols in the slot, and N is an integer greater than or equal to 0;

wherein M can be different for different slots in the transmission period, and N can be different for different slots in the transmission period.

15. The terminal device according to claim 9, wherein the instruction to receive a PDCCH according to the slot format corresponding to the one of the one or more slot format indices indicated by the SFI comprises:
   receive the PDCCH in the M symbols starting from a first symbol in the time unit.

16. The terminal device according to claim 15, wherein the program instruction further comprise:
   receive configuration information sent by a network device, wherein the configuration information is used to configure the transmission period of DCI used for carrying the SFI.

* * * * *